H. P. TOWNSEND.
ATTACHMENT FOR LATHES.
APPLICATION FILED JUNE 4, 1913.
1,195,293.
Patented Aug. 22, 1916.
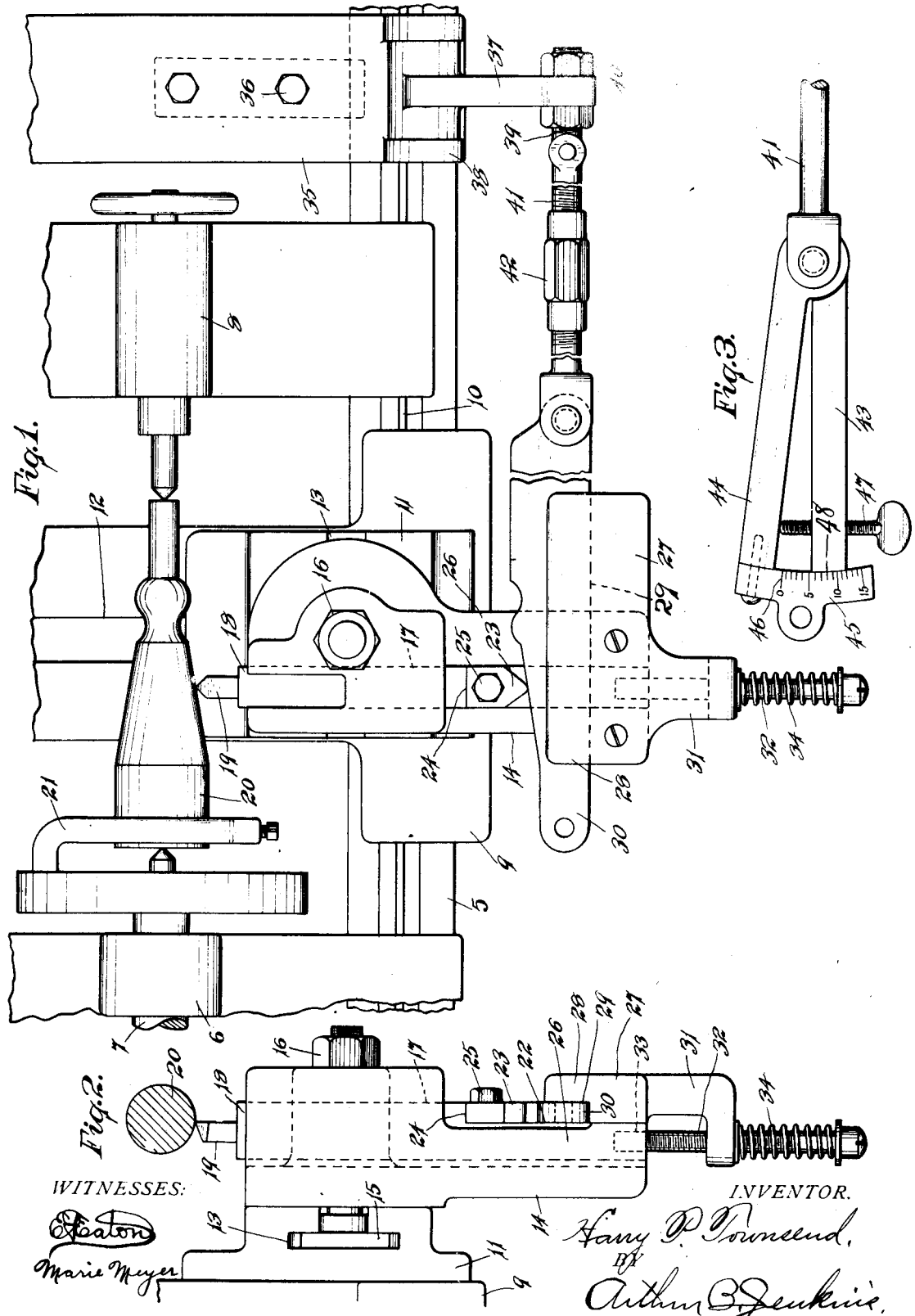

UNITED STATES PATENT OFFICE.

HARRY P. TOWNSEND, OF HARTFORD, CONNECTICUT.

ATTACHMENT FOR LATHES.

1,195,293.  Specification of Letters Patent.  Patented Aug. 22, 1916.

Application filed June 4, 1913. Serial No. 771,683.

*To all whom it may concern:*

Be it known that I, HARRY P. TOWNSEND, a citizen of the United States, and a resident of Hartford, in the county of Hartford and State of Connecticut, have invented a new and Improved Attachment for Lathes, of which the following is a specification.

My invention relates to the class of devices more especially employed for turning pieces to round form, and an object of my invention, among others, is to provide a device which may be readily attached to a lathe by the means commonly employed for attaching regular parts, said device being designed for producing articles of various shapes.

One form of device embodying my invention and in the construction and use of which the objects hereinabove set out, as well as others, may be attained, is illustrated in the accompanying drawings, in which—

Figure 1 is a plan view of a part of a lathe having my improved attachment applied thereto. Fig. 2 is a detail side view of my improved attachment. Fig. 3 is a detail view showing a modified form of my attachment.

In the accompanying drawings the numeral 5 denotes a side part of the bed of a lathe of common construction having a head 6 in which a spindle 7 is mounted and a tail stock 8 mounted on the side parts of the lathe. A carriage 9 is mounted on a guide 10 on the side part of the lathe, this carriage having a tool or cross slide 11 with a part projecting into a groove 12 in the carriage 9. The tool slide has a groove 13 in which a tool post may be adjustably secured. All of the parts above described are of old and well known construction and further and detailed description is therefore omitted herein.

In carrying out my invention, I provide a tool holder 14 having a headed stud 15 located in the groove 13 and with a nut 16 for securing the parts in position, in a manner common to tool holders in machines of this kind. An opening 17 for a tool bar 18 is formed in the tool holder, the bar being arranged to receive a tool 19 to cut a piece of work 20 secured in the lathe as by means of a dog 21, in the ordinary manner. The tool bar 18 is cut away at its back end forming a cut-away part 22 within which a toe piece 23 is secured against a shoulder 24 forming a part of the cut-away portion, the toe piece being held in place as by means of a bolt 25.

The tool holder 14 is formed, at its end, into a shelf 26 to which a cap 27 is secured, this cap extending for some distance beyond the sides of the shelf and having a lip 28 forming a templet recess 29 to receive a templet or pattern 30 slidably located within said recess. An arm 31 projects from the cap and has an adjusting screw 32 loosely mounted therein, this adjusting screw fitting a threaded socket 33 in the tool bar 18 and having a spring 34 by means of which screw and spring the pressure of the toe piece 23 against the templet 30 may be regulated.

A templet holder base 35 is adjustably secured to the side parts of the lathe in any suitable manner, as by means of bolts 36, one of which is threaded into the base 35 and rests with its end against a clamping plate, (shown in dotted lines in Fig. 1) located underneath the side part 5. The other bolt passing loosely through the base 35 is threaded into said clamping plate, the end of which, by means of the bolts, is caused to press tightly against the side part 5 to hold the base 35 in place. A templet holding arm 37 is pivotally mounted between ears 38 on the base 35, the upper end of this arm receiving a threaded rod 39 adjustably secured as by nuts 40 to said arm. A templet rod 41 is pivotally secured to the rod 39, the rod 41 preferably being in two sections secured by an adjusting nut 42 having oppositely threaded recesses at its ends to engage the two sections of the rod 41, by means of which the length of said templet rod may be changed to suit conditions. This rod is pivotally secured to the templet 30 as clearly shown in Fig. 1 of the drawings.

In using my improved device, the tool holder 14 is secured to the slide 11 in the place of the regular tool holder, a templet 30 of the desired form is located in the recess 29 and the holder base 35 and rod 41 are suitably adjusted to perform the operations required. The lathe being set in operation, the carriage 9 is fed along the guides 10 in a manner common to machines of this class and the articles 20 will be given a form corresponding to that outlined on the edge of the templet 30.

The attachment shown in Fig. 3 is designed more especially for turning straight tapered surfaces, the rod 41 being secured as above described and the supporting bar 43 being mounted in the recess 29. A taper bar 44 is pivotally attached to the bar 43 and has a graduated arm 45 slidably engaging the end of the bar 43. This arm 45 has graduations 46 acting in connection with a zero point 48 to determine the relative position of the two bars and hence the degree of taper to be formed on the articles to be operated upon. An adjusting screw 47 is employed in setting the bars to determine the desired angle, one with respect to another.

While I have shown and described herein a preferred form of apparatus illustrating my ideas, this may be departed from to a greater or lesser extent and yet embody the invention, which is therefore not limited to this embodiment in a construction exactly like that herein shown and described.

I claim—

1. In combination with the cross slide of a lathe having means for placing it in different positions toward and away from the axis of the lathe spindle, said slide having a groove arranged in parallel relation with the axis of the lathe spindle, a tool holder having a headed fastening member located in said groove, a tool movably mounted in the tool holder, a templet supported in contact with said tool, and means for holding the templet against movement.

2. A work holder, a movably mounted tool holder having a templet recess with a projecting lip forming a wall thereof, a tool freely movable in said tool holder and extending into said recess, a templet located in said recess under said lip and against said tool, and means for holding the templet against movement.

3. A work holder, a movably mounted tool holder having a shelf at its rear end, an opening extending through the tool holder and forming a groove in said shelf, a tool located in said opening, a cap secured to said shelf forming a templet recess, a templet located in said recess against said tool, and means for holding the templet against movement.

4. A work holder, a movably mounted tool holder having a shelf with an opening through said tool holder and forming a groove in said shelf, a tool movably mounted in said opening, a cap secured to the shelf and forming a templet recess, an arm projecting from said cap, an extension from said tool projecting through said arm, a spring interposed between said extension and said arm to force the tool away from the work, a templet supported in said recess, and means for holding the templet against movement.

5. In combination in a forming attachment for lathes, a movably mounted tool holder and pivotally supported for movement during the cutting operation, a tool freely movable in said holder, a templet resting on said holder and secured by a pivot arranged to permit the templet to move toward and from the axis of the lathe spindle, whereby a cross adjustment of the cross slide may be obtained, a base secured to the lathe, an arm pivotally mounted on the base, and a connection between said templet and arm to hold the templet against movement.

6. In combination in a forming attachment for lathes, a movably mounted tool holder, a tool freely movable in said holder, a base, an arm rising from said base, and a templet pivotally connected with said arm by a pivot arranged to permit the templet to move toward and from the axis of the lathe spindle, whereby a cross adjustment of the cross slide may be obtained and resting on the tool holder against said tool.

7. In combination with the cross slide of a lathe having means for placing it in different positions toward and away from the axis of the lathe spindle, said slide having a recess, a tool holder having a headed fastening member located in said recess, a tool movably mounted in the tool holder, a templet supported in contact with said tool, and means for holding the templet against movement.

8. In combination in a forming attachment for lathes, a movably mounted tool holder, a tool movably mounted in said tool holder, a base, an arm extending from said base, an adjustably extensible support pivotally secured to said arm, and a templet pivotally secured to said support on a pivot arranged to permit the templet to move toward and away from the axis of the lathe spindle, whereby a cross adjustment of the cross slide may be obtained, said templet being in contact with said tool.

9. In combination in a forming attachment for lathes, a movably mounted tool holder, a tool movably mounted in said holder, a base, an arm pivotally mounted on said base, an adjustably extensible rod pivotally secured to said arm, and a templet pivotally secured to said support and on a pivot arranged to permit the templet to move toward and away from the axis of the lathe spindle, whereby a cross adjustment of the cross slide may be obtained, in contact with said tool.

10. In combination with the cross slide of a lathe, a movably mounted tool holder supported thereby, a tool mounted for free sliding movement in said holder, an arm rising from a fixed support, a templet resting in engagement with said tool, and a connection between the templet and said arm, said connection including a double pivot to permit movement of the templet toward and away from the lathe spindle, the said connection also including an extensible rod.

11. In a forming attachment for lathes including a movably mounted tool holder and a tool movably mounted therein, a templet holder, a templet pivotally secured to said holder and including a supporting bar and a forming bar both pivotally mounted with respect to the templet holder and with respect to each other, and means for retaining said bars against relative movement one toward the other.

12. In a forming attachment for lathes including a movably mounted tool holder and a tool movably mounted therein, a templet holder, a templet including a supporting bar and a forming bar pivotally connected and both bars being pivotally connected to said holder, a graduated arm extending from one of said bars, and indicating means upon the opposite bar.

13. In combination in a forming attachment for lathes including a movably mounted tool holder and a tool movably mounted therein, a templet holder, and a templet including a supporting bar and a forming bar both pivotally connected and both movably mounted with respect to each other, a graduated arm extending from the forming bar, means on the supporting bar for determining the position of said arm, and means for preventing the bars from relative movement one toward the other.

14. In a forming attachment for lathes, in combination, with a movably mounted tool holder and a tool movably mounted therein, a templet support, a movably mounted templet resting upon said support, means at each end of said templet for attachment to a holder, and means for holding the templet against movement.

HARRY P. TOWNSEND.

Witnesses:
   Arthur B. Jenkins,
   E. A. Eaton.